Aug. 25, 1931.  J. T. LINDSTROM  1,820,356
AUTOMATIC FEED WATER REGULATOR
Filed April 29, 1929
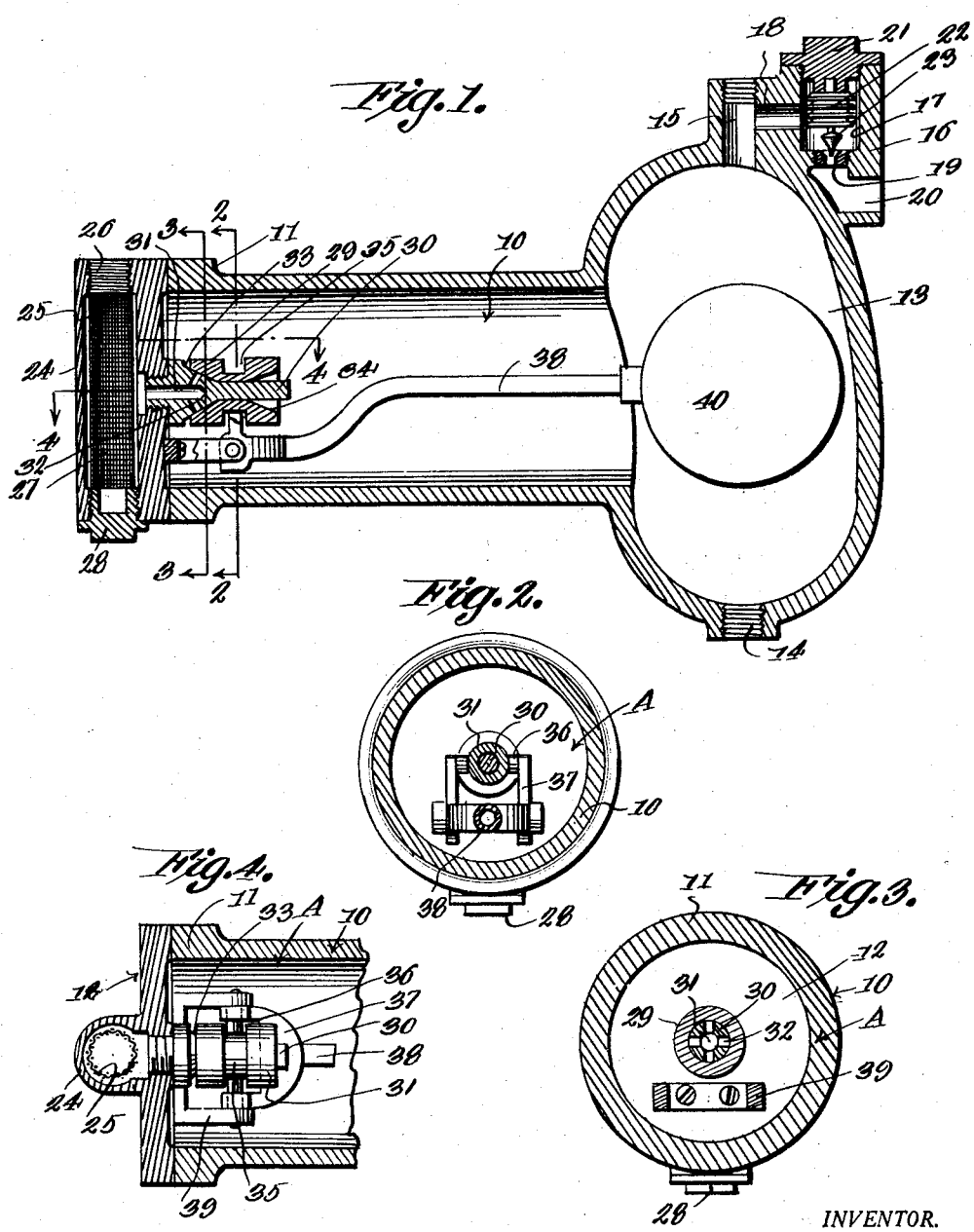
INVENTOR.
JOHN T. LINDSTROM
BY
Irving S. M'Cathran
ATTORNEYS.

Patented Aug. 25, 1931

1,820,356

UNITED STATES PATENT OFFICE

JOHN T. LINDSTROM, OF ALLENTOWN, PENNSYLVANIA

AUTOMATIC FEED WATER REGULATOR

Application filed April 29, 1929. Serial No. 358,960.

This invention appertains to an automatic feed water regulator and steam trap particularly susceptible for use in connection with low pressure steam boilers.

One of the primary objects of my invention is to provide a novel automatic feed water regulator for boilers having a novel valve arrangement therein controlled by a float, the valve being so arranged as to prevent the same from leaking by the collection of foreign matter thereon.

Another important object of my invention is the provision of a removable head for the casing of the water regulator carrying the valve seat and having the water inlet incorporated therewith, with novel means for screening the water prior to the entrance thereof into the casing, a simple means being provided for permitting the removal of the screen and the cleaning thereof when necessary or desirable.

A further important object of my invention is the provision of means in the regulator for allowing the escape of steam into the boiler above the water line and to provide a thermostatic control air valve for breaking the vacuum in the boiler should such condition arise, the valve also permitting the escape of water from the regulator should the inlet valve be leaking for any reason and the water in the boiler at its customary level.

A still further object of my invention is to provide a combined feed water regulator and steam trap of the above character, which will be durable and efficient in use, one that will be simple and easy to manufacture, and one which can be placed upon the market and incorporated with a boiler at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a vertical longitudinal section through the improved water regulator;

Figure 2 is a transverse section through the same taken on the line 2—2 of Figure 1 looking in the direction of the arrows;

Figure 3 is a transverse section through the regulator taken on the line 3—3 of Figure 1 looking in the direction of the arrows;

Figure 4 is a fragmentary longitudinal section taken on the line 4—4 of Figure 1 looking in the direction of the arrows.

Referring to the drawings in detail, wherein similar reference characters designate corresponding parts throughout the several views, the letter A generally indicates my improved combined water feed regulator and steam trap which comprises a casing 10 which can be of substantially cylindrical form. The casing 10 is open at one end and flanged as at 11 for removably receiving the head 12 which can be bolted or otherwise secured to said flange 11. The opposite end of the casing 10 has formed thereon the float chamber 13. The lower end of the float chamber 13 is provided with a water outlet 14 which can lead to the boiler. The upper end of the float chamber 13 is provided with a steam outlet 15 which can lead to the boiler above the water level therein. Formed on and extending laterally of the float chamber 13 adjacent to the upper end thereof is an enlargement 16 having a chamber 17 formed therein. This chamber communicates at a point intermediate its ends with the steam outlet passage 15 by means of a way 18 for a purpose which will be later described. The chamber at its lower end communicates through a removable valve seat 19 with an outlet passageway 20 for a purpose which will also be described. The chamber 17 has its upper end closed by a removable plug 21 which carries a thermostat 22. This thermostat 22 has the inner end thereof carrying the valve 23 for the seat 19 and the valve is moved on and off of the seat by the expansion and contraction of the thermostat 22.

Referring to the head 12, this head is provided with a diametrically extending projection 24 having a cored opening 25 therethrough and one end of the same has the wall thereof internally threaded as at 26 for the reception of the feed water pipe. The opening removably receives a screen 27 of suitable wire mesh and the inner end of the screen fits against a removable plug 28 carried by the projection, which allows for the removal of the screen for cleaning purposes. The head or cover 12 at its axial center is provided with an internally threaded opening 29 which communicates with the cored opening 25 of the projection 24 and this opening has threaded into the same the valve post 30 provided with an axial bore 31 communicating with the opening in the projection. From this opening 31 is a plurality of radially and outwardly extending ports 32 and the outer face of the post at this point is of a substantially conical construction to provide a conical valve seat 33. The post projects a considerable distance beyond the conical valve seat 33 and forms a guide for the double-ended valve 34. This valve 34 is provided with an axial bore for receiving the post 30 and the opposite ends of the bore are flared for fitting upon the valve seat 33 and thus this valve can be reversed when one end of the same becomes worn. The outer face of the valve at the central portion thereof is provided with an annular groove 35 for receiving the lugs 36 on the terminals of the forked end 37 of the float arm 38. The inner end of the float arm 38 is rockably secured to a suitable bracket 39 which can be bolted or otherwise secured to the head or closure cap 12. The outer end of the float arm 38 extends toward the float chamber 13 and has secured thereto a float 40.

In operation of the improved device, the water enters the regulator at 26 and passes through the screen 27 into the opening 29 and the bore 31 of the valve post 30. If the water in the regulator is high enough to keep the water from passing out in the regulator through the ports 32, the water remains in this screen chamber, owing to the fact that the float 40 is raised and the valve is held on its seat over the said ports 32. If the water should be low enough in the boiler, the float would also be lowered and would move the sliding valve away from the conical part of the valve post and open the ports 32. The water will be forced against the flared portion of the valve 34 and form a spray. This spray of water is heated by the steam regulator before entering the boiler, thus preheating the same to a certain extent. This valve is thus automatically operated and will keep the water level in the boiler at an even point at all times. The formation of the valve and seat is such that sediment will not collect thereon which will insure the seating of the valve at all times.

There is a time when there is a creation of vacuum in a boiler system and this is very dangerous, especially when a boiler is fired up and when the lower part of the boiler becomes very hot and the cold water which is drawn in the system by the vacuum, drops back into this heated boiler, the same is liable to crack the boiler. This device functions as an automatic vacuum breaker, in the following manner. As long as there is no steam in the boiler the valve port 19 is opened by the contraction of the thermostat 22 drawing the valve 23 away from its seat making an air connection with the passageway 15 and the passageway 20 to the atmosphere, which prevents a vacuum being formed.

Should, at any time, the water inlet valve or seat become worn and water leaks therethrough after the float has closed the sliding valve against its conical seat, the water would rise in the regulator until it covers the way 18 and the cold water will contract the diaphragm or thermostat 22 which will open the valve and thus give a free opening for the water to pass out through the opening 20.

From the foregoing description it can be seen that I have provided an exceptionally simple form of feed water regulator which will also function as a steam trap and as means for breaking a vacuum in a boiler system and allow excess water to escape from the trap.

Changes in details may be made without departing from the spirit or the scope of this invention, but:

What I claim as new is:

1. In a device of the class described, a cylinder open at one end, a float chamber at the opposite end of the cylinder, a removable cover plate for the open end of the cylinder having a diametrically extending enlargement provided with an opening therethrough, one end of said opening constituting a water inlet, a screen for the water in said opening, a plug closing the opposite end of the opening against which the screen seats, the head having an axial opening communicating with the first mentioned opening, a valve post having an axial bore threaded into the last mentioned opening and provided with a conical valve seat having axial ports therein communicating with the bore, a valve slidable on said post having its opposite ends flared for seating on the conical seat, a float in the chamber, a float arm for the float having a fork on its inner end, a bracket secured to the removable closure, means pivotally securing the inner end of the arm to the bracket, and inwardly directed pins on said fork engaging the slide valve.

2. In a device of the class described, a cylinder having a float chamber on one end, water supply means on the opposite end of said cylinder including an opening communicating with the interior of the cylinder, a valve post having an axial bore threaded into the opening and provided with a conical valve seat having axial ports therein communicating with the bore, a valve slidable on said post having its opposite ends flared for seating on the conical seat, a float in the chamber, a float arm for the float having a fork on its inner end, a bracket secured to the removable closure, means pivotally securing the inner end of the arm to the bracket, and inwardly directed pins on said fork engaging the valve, as and for the purposes set forth.

In testimony whereof I affix my signature.

JOHN T. LINDSTROM.